United States Patent [19]

Kerbaugh

[11] Patent Number: 5,046,262
[45] Date of Patent: Sep. 10, 1991

[54] SPHERICAL EDGE LOCATOR FOR MACHINING

[76] Inventor: Steven M. Kerbaugh, 119 Clement Dr., Somerdale, N.J. 08083

[21] Appl. No.: 588,468

[22] Filed: Sep. 26, 1990

[51] Int. Cl.$^5$ .............................................. G01B 5/25
[52] U.S. Cl. ........................................ 33/644; 33/645; 33/639; 33/626; 33/DIG. 1
[58] Field of Search .................. 33/644, 645, 638, 626, 33/DIG. 1, 639

[56] References Cited

U.S. PATENT DOCUMENTS

| | | | |
|---|---|---|---|
| 2,451,904 | 10/1940 | Beatty | 33/639 |
| 2,665,492 | 1/1954 | Freimark | 33/639 |
| 2,674,807 | 4/1954 | La Russa | 33/639 |
| 2,731,726 | 1/1954 | Timpner | 33/639 |
| 2,860,418 | 11/1958 | Johnson | 33/639 |
| 2,870,542 | 1/1959 | Gasper | 33/645 |
| 3,120,062 | 2/1964 | Butala, Jr. | 33/639 |
| 3,370,356 | 2/1968 | Jend | 33/639 |
| 3,470,618 | 10/1969 | Richer | 33/639 |
| 3,785,057 | 1/1974 | Streander | 33/639 |
| 4,196,522 | 4/1980 | Bell et al. | 33/645 |
| 4,319,400 | 3/1991 | Chung | 33/DIG. 1 |
| 4,433,488 | 2/1984 | Baumgartner | 33/637 |
| 4,447,956 | 5/1984 | Chung | 33/644 |
| 4,790,545 | 12/1988 | Dzewaltowski et al. | 33/645 |

FOREIGN PATENT DOCUMENTS 0218808 9/1991 Japan .................................. 33/644

Primary Examiner—William A. Cuchlinski, Jr.
Assistant Examiner—William C. Dowling
Attorney, Agent, or Firm—Richard C. Litman

[57] ABSTRACT

A corner locator for aligning machine tools comprises a metal sphere with a section removed. The section has the shape of either a right angled corner, which is bounded by three mutually perpendicular planes, or a wedge bounded by two intersecting planes. The three-plane version in use fits onto a corner of a rectangular workpiece, and the two-plane version in use fits onto an edge. In either case all planes bounding the removed sections pass through the exact center of the sphere. With the locator in place, the spindle of the machine tool may be set at any angle whatsoever relative to the faces of the workpiece, and the machine tool spindle axis aligned to pass through the center of the sphere as follows: insert a dial indicator gauge into the spindle; bring the gauge arm into contact with the sphere; rotate the spindle while moving the spindle along the machine axes to locate the point of minimum runout. At this point the spindle axis points directly toward the center. Knowing the radius of the sphere, the machinist now knows the spindle position (relative to the corner or edge) with a precision limited only by the precision of the locator and micrometer. The spindle may then be moved to any point, whose location can be specified relative to the edge or corner, with accuracy now limited only by the precision of the machine tool motions.

12 Claims, 1 Drawing Sheet

SPHERICAL EDGE LOCATOR FOR MACHINING

FIELD OF THE INVENTION

This invention relates to devices for precisely locating a corner or edge of a workpiece relative to the cutter of a machine tool (such as a jig borer, jig grinder, or milling machine), especially when the axis of the arbor or spindle of the machine tool is at an angle to the surfaces of the workpiece; that is, when the axis is not perpendicular or parallel to those surfaces. The precise edge or corner location may then be used to orient the tool to machine any part of the workpiece, by moving the tool fixed distances in various dimensions.

DESCRIPTION OF THE PRIOR ART

In machine shops which use milling machines and the like, it is often required to locate holes, made by a drill bit or ordinary milling cutter, to a certain specified place on a workpiece.

On the drawings used by the machinist, the location of the hole is customarily specified relative to one or more edges of the workpiece. In finding the location of a hole the machinist will first align the edges of the workpiece to the axes of motion of the spindle which holds the cutter; next the machinist will align the milling cutter spindle axis to one vertical edge of the workpiece; then he will move the cutter in a direction normal (perpendicular) to that edge the distance specified on the drawing; then align the spindle axis to the other edge; then move the cutter normal to the second edge the other specified distance. (A third dimension may be set similarly.)

Since edges will meet at angles to form corners, the location of a corner is equivalent to the location of two edges if the corner location is made in two dimensions, and is equivalent to the location of three edges if the corner location is made in three dimensions.

Usually the workpiece is rectangular: edges are mutually perpendicular, or, said differently, the faces meet at right angles. Unless otherwise stated, workpieces discussed herein will be assumed rectangular.

Machine tools are provided with means, such as precision screws, verniers, and so on, for easily moving the spindle a precise distance in a specified direction. In accurately drilling a hole in a workpiece, the location of the edge is the part of the operation which is often more difficult.

The problem of locating an edge is especially troublesome when the spindle axis is inclined to the faces of the workpiece, as when a hole must be drilled into a surface at a compound angle through some particular point. This is because, while several satisfactory devices exist for locating a spindle relative to a face or edge when the axis of the spindle is parallel or perpendicular to the face, no easy and precise method or apparatus has existed for locating a spindle relative to an edge or corner when the spindle axis is not parallel or perpendicular to a face of the workpiece.

In this later case, it has been customary for the machinist to perform the following procedure: first, put layout die on the surface in which the hole is to be machined; then scribe lines at the proper distances from the reference edges of the workpiece, which intersect to mark the centerline of the hole; then secure the workpiece at the desired angle relative to the axis of the spindle of the machine; then mount into the spindle a sharp, pointed tool whose point lies on the spindle axis; then, by eye, line up the sharp point of the tool to the intersection of the scribed lines; and finally, replace the sharp tool with a bit and drill or mill the hole.

With this method, the accuracy is very limited because the sharp point must be aligned by eye. Even with a magnifying glass, the point may not be placed on a surface to better than a few mils (thousandths of an inch).

Thus, the efficiency in drilling angled holes has been hampered by lack of a suitable apparatus for easily finding an edge or corner when a machine tool spindle is angled to a workpiece.

In the prior art, several edge locators are disclosed. One edge locator is that of La Russa, disclosed in U.S. Pat. No. 2,674,807. La Russa shows an edge locator that fits into the chuck of a spindle and contains a frictionally mounted spindle so arranged that it can rotate somewhat. The spindle has a sharp pointed tip distal the spindle chuck. When mounted in and revolved with the spindle, the spindle tip describes small circles. The machinist nudges the moving spindle until the tip ceases to revolve: the pointed tip is now on the spindle axis. This sort of locator is sometimes called a "wiggler".

The La Russa locator may be used to locate any corner, point, or edge; but, its accuracy is limited because the tip must be aligned by eye.

In locating a corner or edge, the La Russa device is hampered by the common practice of "breaking" or radiusing the edges and corners of a piece to avoid cuts to the fingers of those handling the pieces. Even if the edges and corners are left sharp, error is still likely because the edges are very liable to accidental distortion in handling. Indeed, special care must be taken, even with steel, to maintain a sharp corner perfectly square for long. Once damaged, the corner is useless for the La Russa device.

Beatty, in U.S. Pat. No. 2,451,904, shows another frictionally held eccentric locator which is centered while held in a spinning spindle. Instead of a pointed spindle, Beatty places a disc at the bottom of the locator whose centerline is parallel to the spindle axis. The disc will wobble when the spindle is turned. The spindle is slowly moved toward a flat face of the workpiece until the disc ceases to wobble, at which time the disc is centered on the spindle axis. The distance from the spindle axis to the face is then equal to the radius of disc. This sort of locator is also referred to as an "edge finder".

The Beatty locator, like the La Russa device, relies on the visual acuity of the machinist. Also, it does not locate anything but a face parallel to the spindle axis and so does not help in drilling angled holes.

Another locator suited to locating a face is taught by Freimark in U.S. Pat. No. 2,665,492. The Freimark device is essentially a jig that fits into the tapered chuck of a milling machine spindle and holds a dial indicator gauge. The gauge has an arm with a ball end; the dial measures displacement of the ball lateral to the spindle axis. When calibrated and aligned, the Freimark device can locate the axis of the spindle directly to a face of the workpiece paralell to that axis. It is useless in finding an edge or corner, or when the face is not parallel to the spindle axis.

Butala, Jr., in U.S. Pat. No. 3,120,062, discloses an edge locator which has two internally facing, separated plane surfaces which are parallel to but equidistant from a face of the workpiece, on one reference edge of which the device sits. The spindle is fitted with a dial indicator gauge which shows when the spindle axis is equidistant from the two plane surfaces. This device, like those of Beatty and Freimark, only works when the spindle axis is parallel to the workpiece face.

U.S. Pat. No. 3,785,057 of Streander teaches a corner and edge locator consisting of a disc with a central hole and four pins emerging from one side of the disc. The pins are so arranged that their sides, in various combinations, define a straight, a right, and a 45-degree angle. The sides defining these angles meet along the axis of the central hole.

The Streander device only locates in one dimension. Thus to fully locate a right corner in space would require three placements, and three operations of finding the centerline of the central hole (once for each placement). It is useless for directly aligning a spindle axis to a corner when the spindle is inclined.

Chung, in U.S. Pat. No. 4,319,400, teaches a locator made from a length of cylinder. The cylinder is cut by two planes: one passes through the axis of the cylinder; the other is at right angles to the first plane and offset so that it does not pass through the axis. (The cuts form an L shape.) The larger section resulting from the cuts is the locator.

In use, the right-angled cut sits on a right edge of a workpiece. The locator is used to find the position of the face which is against the larger leg of the L on the locator, that is, the locator face which passes through the axis of the cylinder.

A special spindle is used to find the position. This spindle slides within a closely-fitted bore in a mandrel which inserts into the machine spindle; the bore is accurately aligned with the axis of the spindle and with the point of the spindle.

The spindle is spring-biased. A dial indicator gauge is fitted to an arm on the spindle to show the extension of the spindle through the bore.

The spindle end protruding from the spindle is placed in contact with the surface of the cylindrical part of the locator. The spindle axis is parallel to the face whose position is to be measured. As the spindle is slowly moved across the line of the face to be located, the dial indicator gauge reading reaches a peak when the axis of the spindle lies within the face.

One of the plane faces exposed by the cuts has a magnet inserted therein to attach the locator to a ferrous workpiece.

As with the other prior art discussed above, the Chung device cannot be used when the axis of the spindle is inclined to the face.

Another device known in the prior art is the tooling ball, which is a sphere mounted concentrically on a cylindrical shaft, the shaft of diameter less than the sphere. The tooling ball is inserted into a hole of the same diameter as the shaft. It can be used to locate the point at the center of the ball, which is on the axis of the shaft. A dial indicator is fixed off the spindle axis, touching the ball, and the spindle is turned. The spindle axis is aligned to the center of the ball by minimizing runout.

The tooling ball cannot be used on a corner or edge. To locate a remote point using the tooling ball, the tooling ball itself must be accurately located. Thus the hole into which it is inserted must be accurately located. If no hole exists, one may have to be drilled.

This method requires trigonometry, which can be confusing to many people, especially if compound angles are involved. Since much drilling work is done by inexperienced apprentices, the number of errors made in drilling angled holes is even greater than it would be otherwise.

Thus, in the prior art there has been disclosed no apparatus that will easily locate a corner or an edge to the axis of a cutting machine tool spindle when that axis is not parallel to the faces of the workpiece.

Neither is there disclosed a locator that will tell the distance of a cutter from a corner or edge.

SUMMARY OF THE INVENTION

According, an object of the present invention is an edge locator that can align the axis of a cutting machine spindle to pass through an edge of a workpiece.

Another object of the present invention is a corner locator that can align the axis of a cutting machine spindle to pass through a corner of a workpiece.

Still another object is an edge or corner locator that can be easily used when the spindle axis is arbitrarily angled to the faces of the workpiece.

A further object is an edge or corner locator that is easily and inexpensively manufactured.

A final object is an edge or corner locator which is useful with workpieces having radiused or damaged edges or corners.

These and other objects of the present invention will become readily apparent upon further review of the following specification and drawings.

The present invention is a locator which comprises a precision sphere, such as a ball bearing, that has had removed from it a volume bounded by planes; these planes pass through the center of the sphere. If there are two perpendicular planes, the sphere will sit on an edge of a workpiece with its planes both in contact with the plane surfaces of the workpiece. The edge line then passes through the center of the sphere. If there are three perpendicular planes, the sphere will sit on a corner of a workpiece with its planes all in contact with three plane surfaces of the workpiece.

The locator is held onto the workpiece by magnets, double-sided tape, or glue.

In use the workpiece, with the locator in place, is first fastened to the table of a machine tool. The spindle of the machine tool is then set at the desired angle relative to the workpiece. A dial indicator gauge is mounted into the spindle of the machine tool.

The gauge is of the type which indicates sideways deflection of an arm. The gauge is mounted in the spindle so that the gauge arm is off the axis of the spindle, and the arm end is brought into contact with the spherical surface of the locator. The spindle is slowly rotated with the arm end staying in contact with the sphere.

As the spindle rotates, the indicator dial is watched for runout. The spindle is moved about in space, while maintaining the desired angle, until the runout is reduced to zero; that is, until the indicator needle stays in one spot on the dial face under a full revolution of the spindle. At this point, the axis of the spindle passes through the corner. Now a cutter may be mounted in the spindle and the spindle translated to any point.

BRIEF DESCRIPTION OF THE DRAWINGS

Similar reference characters denote corresponding features consistently throughout the attached drawings.

A DETAILED DESCRIPTION OF THE PREFERRED EMBODIMENTS

Figure 1:
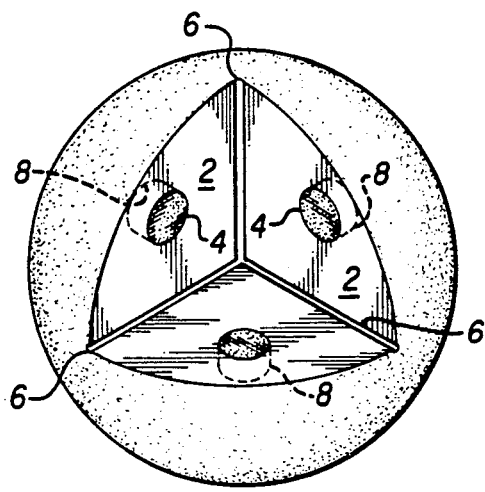
FIG. 1 is a perspective view of the corner locator.

Referring to FIG. 1, a first embodiment L of the instant invention is seen in perspective. It is a partial sphere with a section S removed; the removed section is adapted to fit snugly onto a rectangular corner of a workpiece. The section is bounded by three mutually perpendicular planes 2. Each of the planes passes through the center point of the sphere. Because of the geometry of the locator, its spherical surface is everywhere distant from the internal corner point a distance equal to the radius of the sphere.

Figure 2:
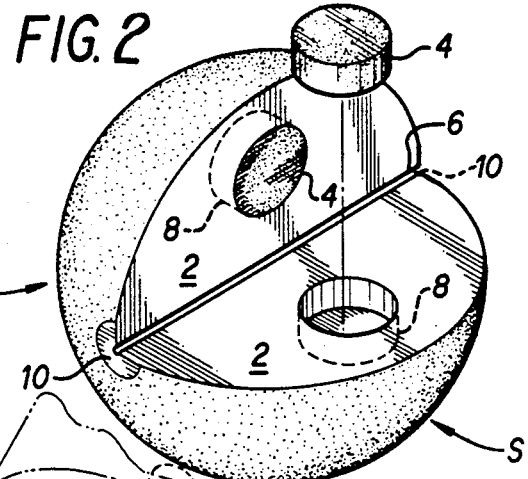
FIG. 2 is a perspective view of the edge locator.
Figure 3:
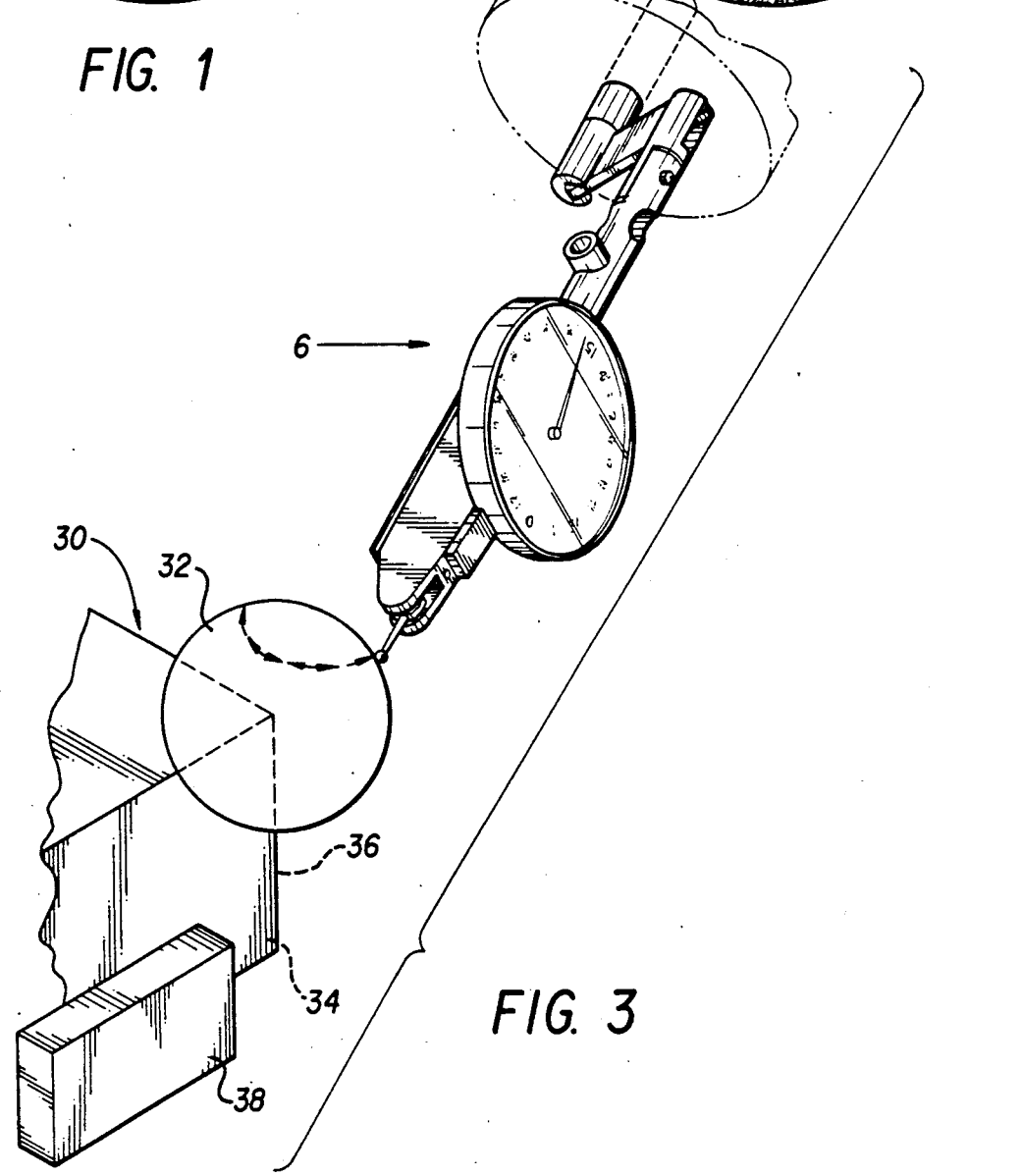
FIG. 3 a perspective environmental view of the corner locator in use. The locator sits in place on the corner of the workpiece. The figure also shows a phantom milling machine spindle which holds a dial indicator gauge whose ball end tip is touching the spherical surface of the locator.

The details and construction of the locators of FIGS. 1 and 2 are discussed below, following a disclosure of how the locator of FIG. 1 might be used with a workpiece and a milling machine. This discussion refers to FIG. 3.

The purpose of the locator is to allow the milling (or drilling) of a hole at any place on a face 32 of the workpiece 30 when the hole is to be milled at an arbitrary angle to the face 32. This milling is accomplished as follows:

The locator L of FIG. 1 is placed upon a corner of the workpiece 30 as shown, with the internal faces 2 closely touching the machined faces of the workpiece 30 32, 34, 36. The piece is held in position by a vise, one of whose jaws 38 is illustrated. As is usual with a milling machine, the edges of the workpiece 30 are aligned with the translation axes (hereinafter referred to as X, Y, and Z) of the milling machine, before the work is begun. The spindle into which the milling cutter is to be put may be aligned at any arbitrary angle relative to the X, Y and Z axes by tilting the cutter head. The desired hole is to be milled at this angle.

A dial indicator gauge G is attached to the spindle 60 of the milling machine. This gauge comprises a body 40, a dial 48 with a movable indicating needle 49, a hinge joint 46, and a hinged arm 44 having a smoothly rounded ball end tip 42. The gauge G is so constructed that movement of the arm 44 around the axis of the hinge joint 46 causes the needle 49 of the indicator dial 48 to move.

Dial indicator gauges of this type are commercially available. They are typically sensitive to arm movements of less than a mil.

The cutter head and spindle are translated along the X, Y, Z axes into a position where the spindle axis passes near to the corner on which the locator L rests; in this position the gauge tip 42 is touching the spherical surface of the locator L.

The spindle is then slowly rotated. The tip 42 stays in contact with the surface of the locator L. The dial indicator 48 is watched for shifting of the needle 49. Any variation in the needle position indicates runout, and shows that the axis of the spindle is not passing through the center of the sphere.

The spindle position X, Y, Z is now adjusted by means of the machine tool axis drives (the cutter head angle is fixed). The machinist constantly rotates the spindle and watches the runout, until a position is found in which the dial 48 indicates no runout. At this point, the revolving tip 42 is describing a circle upon rotation of the spindle. This circle is centered on the spindle axis, and its plane is perpendicular to the axis. Now, the spherical surface of the locator is in contact with this circle; by geometry, the center point of the sphere is on a line that passes through the center of the circle perpendicular to the circle's plane. Hence, the axis of the spindle passes through the center of locator sphere, which is coincident with the corner of the workpiece.

Once the spindle axis is lined up through the corner, a cutter (not shown) may be inserted into the spindle in place of the dial indicator and the spindle extended until the cutter just touches the locator's spherical surface. (Alternatively, the milling cutter may be loosely inserted in the spindle chuck, brought against the locator L, and the chuck tightened.) Knowing the radius of the spherical locator L, the machinist now knows the location of the cutter tip relative to the corner.

Although the cutter head and hence the spindle axis are at an arbitrary angle, the edges of the workpiece will have been aligned with the axes of translation through space of the milling machine cutter head. Thus the spindle can be moved along the axes of the workpiece (which are also the axes of the milling machine) to any point whose position can be referenced to the corner of FIG. 3, and a hole milled at that point. The hole will be precisely located in three dimensions.

Note that the edges or corner of the workpiece 30 may be radiused, or damaged, and the operation of the locator is not impaired. As long as the surfaces 32, 34, 36 are plane and have no protrusions, the faces 2 of the locator L will be coplanar with the faces 32, 34, 36 of the workpiece 30, and the condition of the actual edges is irrelevant.

Referring now again to FIG. 1, it is seen that each of the plane faces 2 of the locator L contains a magnet 4 set flush with, or just below, the plane surface in a cavity 8. These magnets are to attach the locator to a ferrous or ferromagnetic workpiece. The magnets must not extend above the plane surfaces.

Three magnets are shown. Other arrangements, such as a single magnet on one face, or mulitple magnets on each face, are possible. The entire locator may also be magnetized if it is made of suitable material.

The magnets may be attached by various means such as gluing, threading, press fitting, and so on. Epoxy is preferred.

Other locator attachment means are possible. For non-ferromagnetic workpieces, double sided tape might be interposed between the plane faces and the work. If tape is used, the tape may be set into shallow depressions on the faces (not shown in the drawings), whose depth is such that the tape will hold to both surfaces yet will not force the locator faces apart from the work faces. Or, the locator faces may be offset back from the planes intersecting the sphere's center by a distance equal to the thickness of the tape.

Both methods can be combined if the magnet faces are set below the level of the locator surfaces the distance equaling the thickness of the tape. Then the same locator may be used for both ferromagnetic and non-ferromagnetic workpieces. Circular tape discs might be employed.

Glue is also a possible method of attaching the locator to the work. Here, as with the tape, allowance must be made for the thickness of the glue, unless the glue is one having an extremely thin glue line. The glue should be of a type that can be removed from the locator and work without difficulty after machining.

To prevent dirt from accumulating in the corners between the faces 2, and pushing the workpiece out of position, relief grooves 6 may be provided. The grooves 6 are also effective against small dents in unbroken edges of a workpiece.

The locator should be made of material which is rigid to maintain its shape, and hard so as not to wear.

The preferred method of making the locator is by machining a ball bearing. Ball bearings are readily available, cheap, have hardened surfaces, can be magnetized, and may be bought accurately spherical to about 0.0002 inch. The ball bearing can be put into a conical holder to accurately locate it, and held there with a strong magnet mounted inside the cone close to the bearing. The bearing can then be precision machined by an electrical discharge machine (EDM) using a cutter in the shape of a right corner.

A second embodiment of the instant invention is shown in FIG. 2. This embodiment has only two plane surfaces and is intended to be put on an edge, as opposed to a corner. The magnets 4 and relief groove 6 are as in the first embodiment of FIG. 1. One of the disc-shaped magnets 4 is shown removed from its cavity 8.

A new element is the two flat end surfaces 10. These flats are concentric with and normal to the line of intersection of the planes, and equidistant from the center of the sphere.

A particular point along the edge may be found with the use of the two end flats 10. The sphere can be centered on a point along the edge by reference to either flat, as the distance from the center to either flat is known.

The dial indicator gauge is brought into contact with the spherical surface as described above, and again moved until the dial reads a minimum. The spindle axis now points at the center of the sphere, which is also the point along the edge of the workpiece found by using the flats.

It is to be understood that the present invention is not limited to the sole embodiment described above, but encompasses any and all embodiments within the scope of the following claims. In particular, the discussion of right angled workpieces and section planes does not indicate that the device cannot be made with other angles to work with pieces having faces at angles other than right angles.

I claim:

1. An edge locator comprising a body bounded by:
a partial spherical surface, said partial spherical surface defined by a constant radius about a center point;
a plurality of plane locator surfaces, each of said plane locator surfaces passing through said center point; and
attachment means for removably attaching said locator to a workpiece having a plurality of plane workpiece surfaces, the plane workpiece surfaces so disposed that each one of the plane workpiece surfaces may be made coplanar with a respective one of said plane locator surfaces, said attachment means adapted to hold the respective surfaces mutually coplanar; whereby
when said locator is attached to the workpiece, each point of said partial spherical surface is equidistant from the mutual intersection of all of the plane workpiece surfaces if there are more than two of the plane workpiece surfaces, and each point of said partial spherical surface is equidistant from the midpoint of the line of mutual intersection of both of the plane locator surfaces if there are exactly two plane workpiece surfaces.

2. A locator according to claim 1, wherein
said locator is magnetized for attaching to a ferromagnetic workpiece.

3. A locator according to claim 1, including
at least one cavity in at least one of said plane locator surfaces,
each one said cavity adapted to internally accept a respective magnet,
each one said magnet having a respective essentially plane magnet surface,
each one said magnet adapted to be held within respective one said cavity,
holding means for holding said magnet firmly within said cavity so that said magnet surface is essentially parallel to said plane locator surface, whereby
said locator is magnetized for attaching to a ferromagnetic workpiece.

4. A locator according to claim 3, wherein
said magnet surface is essentially flush with said plane locator surface.

5. A locator according to claim 3, wherein
said attachment means further includes double sided adhesive tape, and wherein
said magnet surface is offset from said plane locator surface sufficiently to allow said double sided adhesive tape to occupy said magnetic surface while said plane locator surface is coplanar with the plane workpiece surface and simultaneously said double sided tape touches the plane workpiece surface and said magnetic surface.

6. A locator according to claim 1, wherein
said attachment means includes double sided adhesive tape, and said locator includes
at least one planar recessed area on at least one of said plane locator surfaces adapted to receive said double sided adhesive tape,
said recessed area is parallel to said plane locator surface,
said recessed area is offset from said plane locator surface sufficiently to allow said double sided adhesive tape to occupy said recessed area while said plane locator surface is coplanar with the plane workpiece surface and simultaneously said double sided tape touches said the workpiece surface and said plane locator surface.

7. A locator according to claim 1 including
corner relief grooves along the intersections of each pair of said plane locator surfaces for avoiding buildup of dirt along the intersections.

8. A locator according to claim 1 wherein
there are exactly three of said plane locator surfaces, each one of said plane locator surfaces at right angles to each one of the other two said plane locator surfaces, whereby said locator may be attached to a right corner of the workpiece.

9. A locator according to claim 1 wherein
there are exactly two of said plane locator surfaces, and said locator including
a pair of flat surfaces, each one of said flat surfaces normal to the line of intersection of said plane locator surfaces,
said flat surfaces equally distant from said center point of said partial spherical surface, whereby said flat surfaces may be used to locate said center point relative to a reference point along an edge to which said locator is attached.

10. A locator as in claim 9 wherein
each one of said plane locator surfaces is at right angles to the other one of said plane locator surfaces.

11. A method of locating a spindle of a machine tool, said spindle having a rotation axis, relative to a workpiece having edges and corners, comprising the steps of:
fastening said workpiece to said machine tool;
providing a locator, said locator including a spherical surface and adapted to be fixed upon one of said corners or edges of said workpiece so that said spherical surface is centered upon the one corner or upon a point of the one edge;
fixing said locator upon said one corner or edge of said workpiece so that said spherical surface is centered upon said one corner or upon said point of said edge;
setting an angle of said rotation axis relative to said edges of said workpiece;
inserting a gauge into said spindle, said gauge having a movable arm, said arm having an end, so that said end is located off said rotation axis;
placing said end of said gauge arm into contact with said spherical surface;
rotating said spindle about said rotation axis while said end of said gauge arm is maintained in contact with said spherical surface;
noting runout, indicated by said gauge, while rotating said spindle;
adjusting the position of said spindle to minimize said runout while maintaining said angle, previously set, of said rotation axis relative to said edges; whereby said rotation axis is directed through the corner or point.

12. A method as in claim 11 wherein said machine tool includes translation axes and including
aligning said edges of said workpiece to said translation axes.

* * * * *